May 16, 1967 W. J. DOMBECK 3,319,327
TOOL FOR POSITIONING A WHEEL ON AN AXLE
Filed Oct. 23, 1965
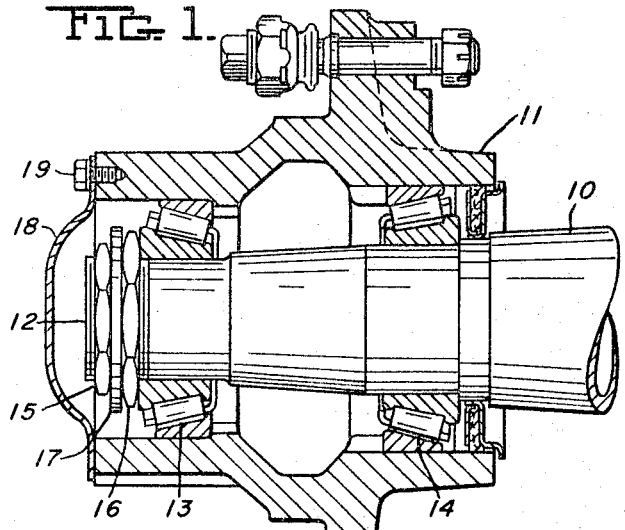
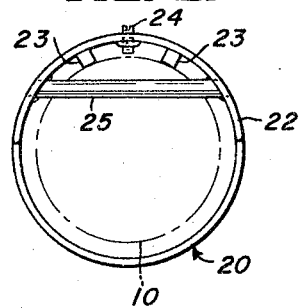
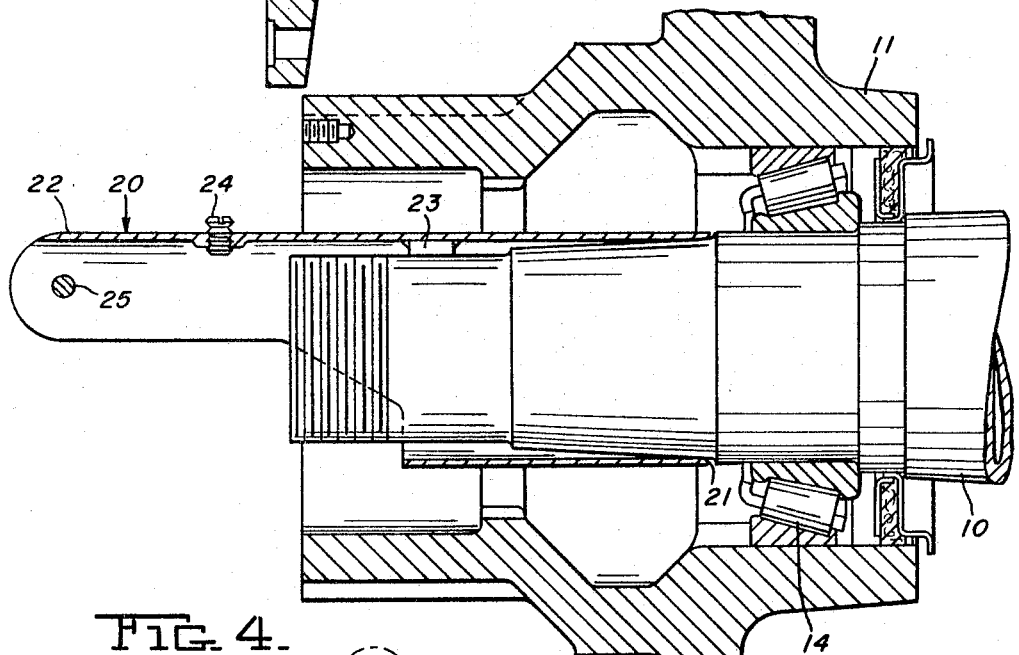
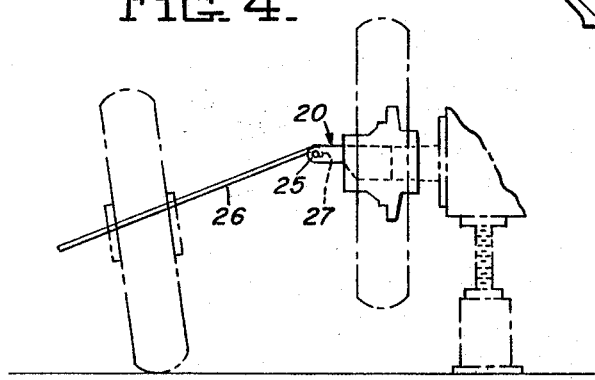
INVENTOR.
WALTER J. DOMBECK
BY *Christy, Parmelee & Strickland*
Attorney

United States Patent Office 3,319,327
Patented May 16, 1967

3,319,327
TOOL FOR POSITIONING A WHEEL ON AN AXLE
Walter J. Dombeck, 525 1st Ave., Ellwood City, Pa. 16117
Filed Oct. 23, 1965, Ser. No. 503,102
7 Claims. (Cl. 29—273)

ABSTRACT OF THE DISCLOSURE

This invention relates to a tool for removing and replacing a wheel on an axle and for otherwise axially positioning a wheel on an axle. The tool comprises a protective sleeve which is positionable over a vehicle axle when a wheel is removed or replaced, and a lever bar detachably connected to the sleeve whereby to raise and lower a wheel assembly onto and from the sleeve, the sleeve also having means on its inner wall engaging the axle to hold the sleeve in spaced relation to the axle. A stop member may be provided on the outer end of the sleeve to limit the extent to which a wheel assembly is slidable over the sleeve.

---

It is often necessary to remove and replace vehicle wheels in order to reline brakes, replace grease seals and bearings and to perform numerous other types of routine and emergency maintenance. In large trucks or the like these wheels weigh several hundreds of pounds, and the handling of them has heretofore required special equipment which is bulky and expensive. Consequently, such tools are generally available only in maintenance depots or repair shops where truck traffic warrants the expense of the equipment. Attempting to remove or replace a heavy truck wheel without the aid of special tools is not only dangerous but is often damaging to the wheel or axle, particularly the threads on the outer end of the axle, over which the wheel must pass.

The present invention provides a tool which is simply designed, inexpensive and compact so that it may be carried with the vehicle itself and can be stocked by small gas stations and the like at little expense. An individual can remove and replace a heavy truck wheel without other special equipment and without damaging the wheel or axle.

Truck axles are generally tapered toward the outer end and the wheel is supported thereon by bearings interposed between the axle and the hub of the wheel. The outer end of the axle is threaded to accommodate jam nuts which retain the wheel in place on the axle. There are generally two axially spaced bearing assemblies, one at the outer end of the axle and one spaced inwardly. When the wheel is to be removed the jam nuts are first removed, then the outer bearing assembly, whence the wheel may be pulled axially outward to clear the axle.

According to the invention a protective sleeve is positioned around the axle after the jam nuts and outer bearings are removed and before the wheel is pulled outwardly on the axle. The sleeve extends beyond the end of the axle to provide, in effect, a longitudinal extension of the axle. The wheel may be slid over this sleeve onto a lever cooperating with the sleeve to lower the wheel to the ground. The wheel can be elevated from the ground to the axle by using the lever to lift the wheel into alignment with the axle so it can be slid over the sleeve into position on the axle. Means are provided for restraining movement of the sleeve relative to the axle while the wheel is being removed or replaced. Oftentimes it is not necessary to completely remove the wheel from the axle to perform certain items of maintenance if the wheel can be moved axially outward far enough to gain access to the parts requiring attention. The sleeve provides a means for accomplishing this easily and without damage to the axle.

An object of the invention is to provide a new and useful tool for positioning a wheel on an axle.

Another object is to provide a simple and inexpensive tool for removing and replacing a wheel on an axle.

These and other objects will be apparent to those skilled in the art and more fully understood by reference to the following description, wherein:

FIG. 1 is a general view in section of an axle and wheel with which the invention may be used;

FIG. 2 is a view similar to FIG. 1 but showing the tool of the invention in position on the axle;

FIG. 3 is an end view of the sleeve; and

FIG. 4 illustrates how a wheel may be raised and lowered to and from an axle.

Referring to the drawings, FIG. 1 illustrates a portion of a truck axle 10 with a wheel assembly 11 mounted thereon. As is typical, the axle is tapered from its inner portion to the outer portion and has a threaded outer end 12. The details of wheel assembly 11 will not be described as its general construction is known in the art and does not form part of the present invention. The wheel assembly rotates on the axle 10 on suitable bearing assemblies 13 and 14 which are axially spaced along the axle. Jam nuts 15 and 16 and washer 17 on the threaded end 12 retain the wheel on the axle 10. Over the end of the axle there is a hubcap 18 held in place by the bolts 19.

The general description thus far relates to environment for the invention and forms no part of the invention itself.

FIG. 2 shows the invention in place on the axle 10 after having removed from the assembly of FIG. 1 the hubcap 18, jam nuts 15 and 16 and washer 17 and the outer bearing assembly 13. As best seen in FIG. 3, the sleeve 20 has a hollow, open-ended cylindrical body of a diameter larger than the narrowed end portion of the axle 10. The inner end of the sleeve preferably has a beveled or tapered inner diameter, indicated at 21, to conform generally to the shape of the axle at that location. The outer diameter of sleeve 20 is approximately equal to the diameter of the axle adjacent the inner end of the sleeve whereby the sleeve 20 forms a continuation of the next larger diameter portion of the tapered axle. The sleeve 20 is therefore in spaced relation to the end portion of the axle from the inner end of the sleeve to the extreme end of the axle. The sleeve 20 has a generally semi-diameter upper outer portion 22 which extends outwardly beyond the end of the axle to effectively form a longitudinal extension of the axle.

On the inner top surface of the sleeve there are affixed a pair of circumferentially spaced radially inward projecting blocks or studs 23 intermediate the ends of the sleeve and which bear on the axle inwardly of the threaded portion of the axle. The dimensions of the studs are such that the sleeve is held in position such that its surface provides a substantial continuation of the larger diameter portion of the axle. Preferably the inner surfaces of the studs are curved to conform to the shape of the axle whereby they fit snugly against the axle. The studs aid in restraining movements of the sleeve by their frictional engagement with the axle when a wheel assembly is slid thereover. The studs or supporting blocks may be suitably affixed by welding or the like. Preferably the sleeve is constructed of a heavy metal material such as steel which can withstand the weight of a wheel assembly without deforming.

Near the outermost end of the sleeve there is provided a threaded opening through the top wall of the sleeve in which may be inserted a set screw 24 or the like which is screwable into a position wherein it projects upwardly therefrom, and into a position wherein it is flush with or recessed below the top surface of the sleeve. This provides a stop to prevent the wheel assembly from sliding off the end of the sleeve when it is desired to only pull the wheel assembly outwardly on the sleeve to gain access to other parts located inwardly of the wheel. Also near the outermost end of the sleeve there is a cross bar 25 which extends horizontally between opposing side walls of the sleeve. This bar provides a fulcrum for the lever bar 26 (FIG. 4) which has a crooked end 27 for engagement with the cross bar 25. As seen in FIG. 4, the wheel assembly can be slid onto the lever bar 26 and safely lowered to the ground.

To elevate the wheel assembly back into position on the axle, the lever bar is passed through the central axle-receiving opening in the wheel assembly and the crooked end of the lever engaged with the cross bar 25. The assembly can then easily be lifted into alignment with the axle and slid over the sleeve back into position on the axle.

The tool of this invention provides a simple and inexpensive means for removing and replacing a wheel assembly on an axle and an individual can perform the necessary operations by himself.

While one embodiment of the invention has been described, it will be apparent to those skilled in the art that various modifications in the construction and arrangement of parts are possible within the scope and spirit of the invention.

I claim:

1. A tool for use on the threaded outer end portion of a vehicle axle when a wheel assembly is to be positioned on the axle toward or away from the end portion, comprising,
    (a) a sleeve member slidable over the threaded end of the axle, the sleeve having an inner portion extending inwardly beyond the threaded portion and an outer portion extending outwardly beyond the outermost end of the axle, and
    (b) means disposed intermediate the sleeve and the axle and abutting the sleeve and axle to support the sleeve in spaced relation to the axle.

2. The combination as defined in claim 1, including means on the outer end of the sleeve for limiting the extent to which the wheel assembly may be outwardly moved.

3. The combination as defined in claim 1, including a lever bar, and a horizontal cross bar mounted on the sleeve adjacent the outer end thereof to provide a fulcrum for the lever, the lever bar being detachably secured to the cross bar, whereby the wheel assembly may be slidable over the sleeve onto the lever and lowered, and vice versa.

4. A tool for use on the threaded outer end portion of a vehicle axle when a vessel assembly is to be positioned on the axle toward or away from the end portion, the axle tapering from an inner first diameter portion to an outer portion of lesser diameter, comprising,
    (a) a hollow cylindrical sleeve positionable over the lesser diameter portion of the axle and extending outwardly beyond the threaded outer end portion, the inner end of the sleeve being shaped to conform substantially to the taper of the axle, the outer diameter of the sleeve being substantially equal to the first diameter portion of the axle, whereby the sleeve provides a substantial continuation of the first diameter portion,
    (b) a pair of circumferentially spaced supporting blocks fixed to the inner surface of the sleeve intermediate the ends of the sleeve, and projecting radially inward into abutting relation with the lesser diameter portion of the axle, for supporting the sleeve when a wheel assembly is resting on the sleeve.

5. The combination as defined in claim 4, wherein the sleeve is provided with a generally semi-cylindrical outer end portion extending beyond the end of the axle, which portion is the upper semi-cylindrical portion, and a horizontally disposed cross bar extending between arcuately spaced points on the semi-cylindrical portion.

6. The combination as defined in claim 4 including a set screw projecting upwardly from the upper portion of the sleeve adjacent the outer end thereof.

7. The combination as defined in claim 1, wherein the means disposed intermediate the sleeve and axle comprises a lug fixed to the inner wall of the sleeve.

References Cited by the Examiner

UNITED STATES PATENTS

| 1,649,130 | 11/1927 | Schoenwerk | 29—273 |
| 1,658,451 | 2/1928 | Long | 254—133 |

FOREIGN PATENTS

| 936,311 | 2/1948 | France. |
| 870,507 | 3/1953 | Germany. |

OTHELL M. SIMPSON, *Primary Examiner.*